Nov. 18, 1941.   A. L. GRISÉ   2,263,296
GAS SEPARATING APPARATUS
Filed Nov. 27, 1939   4 Sheets-Sheet 1
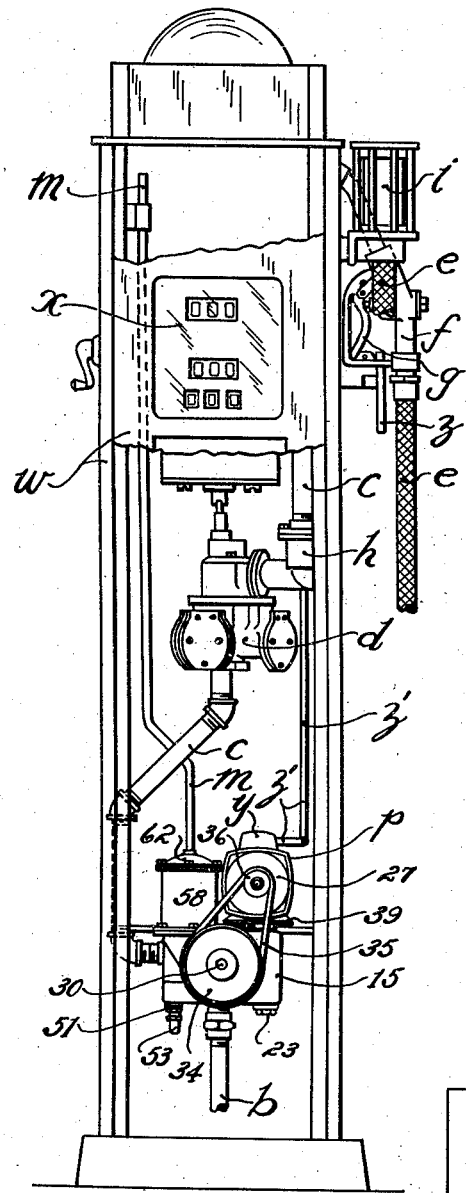
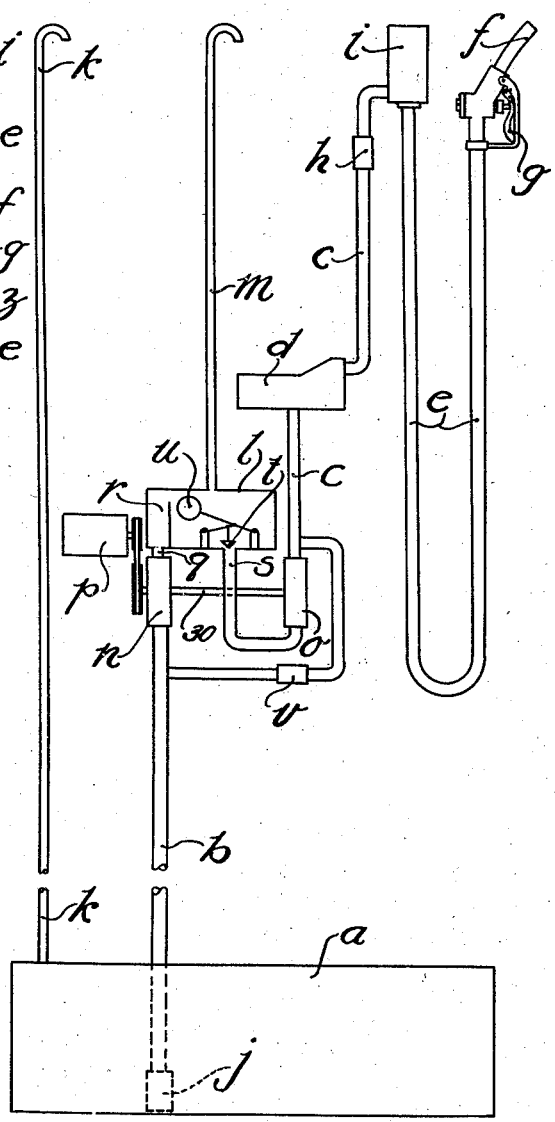
INVENTOR
ALFRED L. GRISÉ
BY Chapin & Neal
ATTORNEYS Nov. 18, 1941.   A. L. GRISE   2,263,296
GAS SEPARATING APPARATUS
Filed Nov. 27, 1939   4 Sheets-Sheet 2
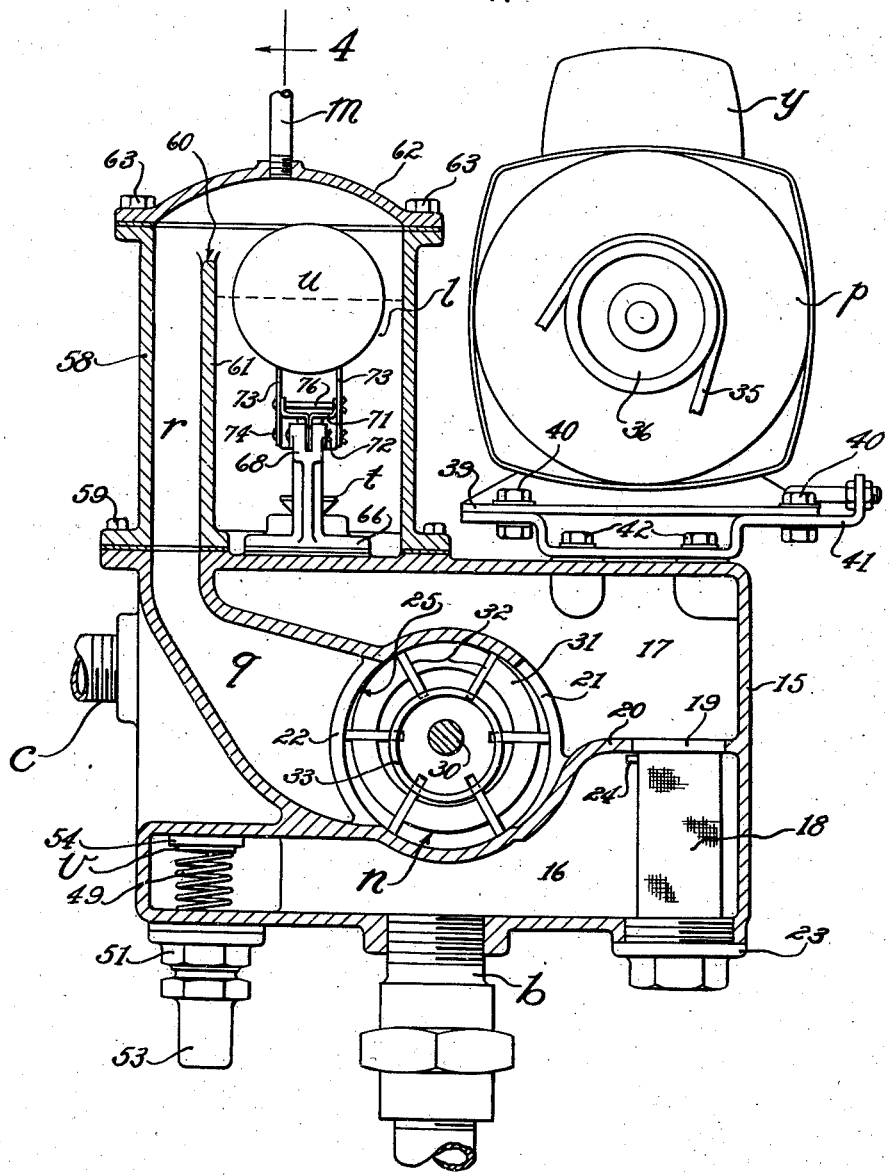
INVENTOR
ALFRED L. GRISÉ
BY
Chapin & Neal
ATTORNEYS

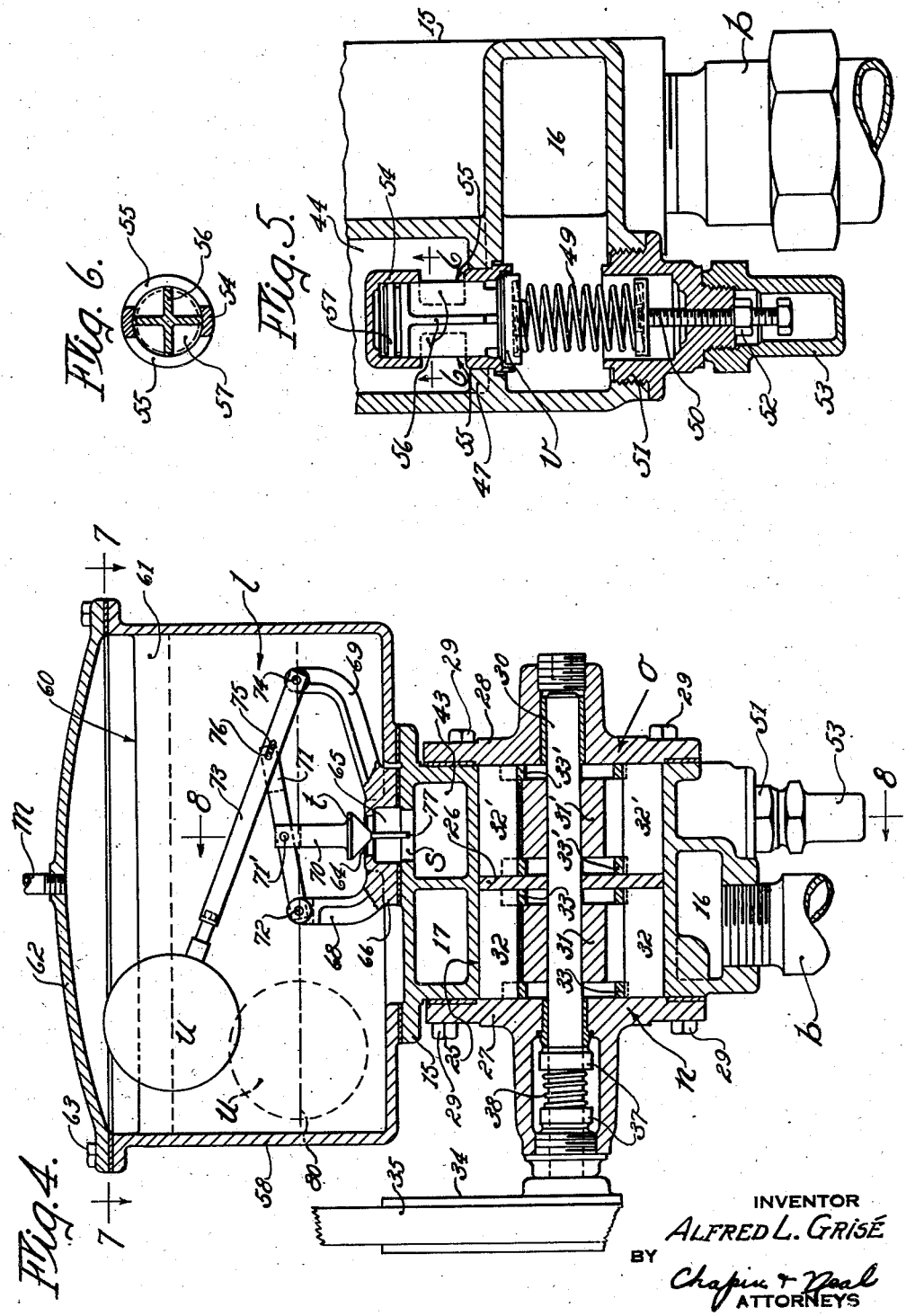

Nov. 18, 1941.  A. L. GRISÉ  2,263,296
GAS SEPARATING APPARATUS
Filed Nov. 27, 1939  4 Sheets-Sheet 4

INVENTOR
ALFRED L. GRISÉ
BY
Chapin & Neal
ATTORNEYS

Patented Nov. 18, 1941

2,263,296

UNITED STATES PATENT OFFICE 2,263,296

GAS SEPARATING APPARATUS

Alfred L. Grisé, Springfield, Mass., assignor to Gilbert & Barker Manufacturing Company, West Springfield, Mass., a corporation of Massachusetts Application November 27, 1939, Serial No. 306,263

3 Claims. (Cl. 103—203)

This invention relates to an improved apparatus for pumping and dispensing measured quantities of motor fuels, including for example, gasoline and other highly volatile liquid fuels, The general practice, heretofore, in gasoline dispensing apparatus has been to utilize a single, positively-acting, displacement pump for drawing up the liquid from a low-level supply tank and for forcing it under substantial pressure through a separator and thence through a meter and the dispensing hose to the desired point of discharge. The separation of air or other gases from the liquid supplied to the meter has been effected in the separator under substantial pressure—say for example fifteen pounds per square inch. Through the vent of this separator there usually flows a stream of mixed air and liquid. Such stream is sometimes led directly back to the supply tank and sometimes to the low pressure side of the pump for the purpose, in either case, of recovering the liquid component of the stream which escapes through the vent of the separator. The prior practice, in either case, involves the diversion of a part of the pumped liquid from the main pumped stream; the subsequent recovery of the diverted liquid; and the return of the diverted liquid to the pump, which again has to put such liquid under substantial pressure.

This invention is a variation of that disclosed in an application of Warren H. DeLancey, filed September 19, 1939, under Serial No. 295,595, and having the same general object—namely, the provision of an air-separating chamber, wherein separation of air or gases from the liquid is effected at substantially atmospheric pressure, and under other very favorable conditions, without diverting any part of the pumped liquid from the main pumped stream. Liquid, once raised by the pump to the separator, does not under any usual operation of my construction flow back to a point where it has to be pumped up again.

The invention, like that of the aforesaid application, also provides for the division of the work of pumping between two pumps, which are preferably located at or about the same level and driven simultaneously, preferably by the same means, and for the interposition of the separator between these two pumps, preferably at a location close to the level of the pumps—the arrangement being such that one pump supplies liquid to the separator at substantially atmospheric pressure and the other pump receives air-free liquid from the separator and forces it through a meter and a delivery conduit to the desired point of discharge.

One feature of the invention consists in the provision, in a series arrangement of two pumps and an interposed air separator of the class above described, of means for trapping liquid in the separator and maintaining it filled with liquid to a certain minimum level under all normal operating conditions—characterized in that drainage of the separator into either of the pumps is prevented and outflow of air into the second pump of the series is prevented.

The invention has for another feature the provision in a series arrangement, such as described, of two pumps and an interposed separator, of a by-pass from the discharge side of the second pump in the series to the suction side of the first pump in the series—such by-pass being controlled by a valve which opens in response to rise in pressure, or tendency to rise in pressure, in the delivery conduit above any desired pressure during dispensing.

The invention also has for another feature the provision in an air separator of a separating chamber having a vent for the escape of the separated air and for maintaining the chamber at substantially atmospheric pressure and having also means for regulating the level of liquid therein and maintaining such level below the vent and above the outlet for air-free liquid, together with an inlet to the chamber of much larger cross sectional area than the outlet, and a relatively long dam between the inlet and the chamber over which the liquid flows slowly in a wide and shallow stream into the separating chamber.

Other features of the invention, distinguishing it from the prior art, will be found in the combinations as pointed out in some of the appended claims.

The invention will be disclosed with reference to the accompanying drawings, in which:

Fig. 1 is a diagrammatical view of a liquid dispensing apparatus embodying the invention;

Fig. 2 is a small-scale elevational view, partly in section, showing the apparatus as embodied in a conventional form of casing for use in the dispensing of motor fuels at service stations;

Fig. 3 is a sectional elevational view, drawn to a much larger scale and showing the unit containing the pumps and separator and associated control devices—the section being taken through the first stage pump;

Fig. 4 is a cross sectional view taken on the line 4—4 of Fig. 3;

Fig. 5 is a fragmentary cross-sectional view of the by-pass valve;

Fig. 6 is a sectional plan view taken on the line 6—6 of Fig. 5;

Figure 7:
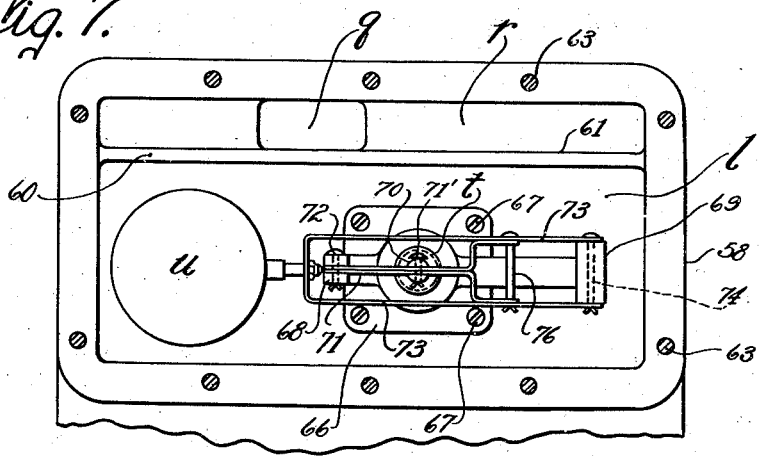
Fig. 7 is a sectional plan view taken on the line 7—7 of Fig. 4.

Referring to these drawings, the apparatus as a whole is shown in diagrammatical form in Fig. 1. This view will serve to show all the more important parts of the apparatus and their relative location. This apparatus, in common with those of the prior art, operates to draw up gasoline or the like from a suitable source of supply, such as an underground storage tank $a$, through a suction pipe $b$, and force it through a delivery conduit $c$, having interposed therein a meter $d$ of any suitable type. The delivery conduit usually terminates with a flexible hose section $e$, having on its delivery end a valve-controlled nozzle $f$. The valve of this nozzle closes automatically in the usual and well-known way and may be opened manually by means of a hand lever $g$. An example of one nozzle construction suitable for the purpose is shown in Fig. 4 of DeLancey Patent No. 2,043,035, dated June 2, 1936. Interposed in the delivery conduit $c$ is a valve device $h$. This device includes a check valve opening in the direction of normal flow under small pressure and closing automatically to prevent return flow. The device $h$ also includes a reversely-arranged check valve which opens to permit return flow and provide relief for expansion of liquid in the hose, after a substantial pressure, say 20 pounds per square inch, has been established. An example of one valve device suitable for the purpose is shown in Fig. 2 of the Willson Patent No. 1,964,616, dated June 26, 1934. It is usual also to interpose a sight glass flow indicator $i$ in the delivery conduit. The suction pipe $b$ has the usual foot valve $j$, or other non-return valve, and the tank $a$ is vented to the atmosphere in the usual or any suitable way, as by the pipe $k$.

The apparatus includes a single separator chamber $l$ which is continuously vented to the atmosphere by a pipe $m$, and a pair of pumps $n$ and $o$ which are closely coupled in a series relation at or near the same level for simultaneous operation by any suitable means, such as an electric motor $p$. As herein shown, the pumps $n$ and $o$ are both positively-acting displacement pumps. It is essential, in any event, that pump $n$ should be of this type in order to enable priming of the dispensing apparatus in case of leakage of the foot valve $j$. The pump $n$ which draws liquid up pipe $b$, feeds such liquid at substantially atmospheric pressure and at low velocity into the separator chamber $l$ through passages $q$ and $r$. In chamber $l$, separation of air and liquid occurs under very favorable conditions by the simple action of difference in densities. The air escapes through pipe $m$. The pump $o$ is fed with the air-free liquid which accumulates in the base of chamber $l$ through a passage $s$ under the control of a valve $t$ which responds to the level of liquid in chamber $l$—as by being actuated by a float $u$. The pump $o$ forces the liquid through the delivery conduit $c$ and the hose section $e$ thereof. When the outlet of this conduit is closed, as by valve of nozzle $f$, then liquid can by-pass from the conduit $c$ back to the suction side of pump $n$, under the control of a valve $v$ which opens only when the pressure in conduit $c$ exceeds a predetermined pressure. Such pressure is somewhat greater than the maximum pressure used for dispensing and may be, for example, 18 pounds per square inch.

The apparatus is usually mounted in a casing $w$ (Fig. 2). The pumps $n$ and $o$, motor $p$ and meter $d$ are suitably supported inside the casing, as indicated, and the hose $e$, nozzle $f$ and indicator $i$ being exposed outside the casing. A register $x$, suitably driven by meter $d$ as indicated, is mounted so that its indications are visible from outside the casing $w$. The motor $p$ has a control switch $y$ operable from outside the casing by a lever $z$ and suitable connections, indicated in part at $z'$, all in the usual way as is well understood by those skilled in the art.

Referring now to Fig. 3, the first stage pump $n$ is mounted in a hollow casting 15, which is cored out to provide various chambers and passages, such as a suction chamber 16, an inlet chamber 17, as well as the discharge passage $q$, above described. Liquid entering the suction chamber 16 passes through a cylindrical filter screen 18 into the interior thereof. The upper end of screen 18 which is open is encompassed by a ring 19 fixed thereto. This ring 19 closely fits in a cylindrical opening in the partition 20, which separates the chambers 16 and 17. Liquid thus leaves through the open upper end of screen 18 into the inlet chamber 17 and thence passes by way of a port 21 into the first-stage pump $n$. Liquid leaves the pump through a port 22, entering the passage $q$ and thence into the vertically-upstanding inlet passage $r$ of the separator $l$.

The filter screen is fixed to a threaded member 23 removably secured in the base of suction chamber 16. The screen has fixed thereto a pin 24, which, by engagement with the lower face of partition 20, prevents the screen from being thrust upwardly too far and properly locates ring 19 in its seat in partition 20.

Referring to Fig. 4, it will be noted that the member 15 has a cylindrical passage 25 extending from end to end thereof, and a central partition 26. The ends of this passage are closed, one by an end plate 27 and the other by an end plate 28—both plates being suitably secured to member 15 as by cap screws 29. These end plates serve to rotatably support the drive shaft 30, to which is fixed the rotors of both pumps $n$ and $o$. These rotors are mounted side by side on opposite sides of the partition 26. This partition closely fits the passage 25 and shaft 30. The rotors are exactly alike. Therefore, one rotor only will be described, and corresponding parts of the other will be designated by the same reference numerals with the addition of a prime. The pump $n$ has a rotor 31 of cylindrical form, suitably fixed to shaft 30. The shaft and rotor are disposed eccentrically of chamber 25 (Fig. 3). This rotor is equal in length to the length of its half of passage 25 (Fig. 4) and its end faces abut, one with partition 26 and one with end plate 27. Rotor 31 is radially slotted (Fig. 3) at angularly-spaced intervals to receive a series (six as shown) of blades 32, each substantially equal in length to the length of the rotor. Each end face of rotor 31 is counterbored to freely receive a ring 33. Each ring engages all the blades 31 at one end thereof and these two rings serve to maintain all the blades in outwardly-extended position and in contact with the peripheral wall of passage 25.

The driving shaft 30 for the pumps, which as described is mounted in the end plates 27 and 28, extends outwardly through and beyond the end plate 27 and has fixed thereto a pulley 34 (Fig. 4) driven by a belt 35 from a pulley 36 on the motor $p$ (Fig. 2). Inside the hub of end plate 27 (Fig. 4) are suitable sealing means such as the two seal rings 37 which are pressed apart by a spring 38.

The motor p may be supported by the member 15 or in any other suitable way. As shown in Fig. 3, the motor is carried by an adjustable bed plate 39, which may be clamped in various positions of adjustment by bolts 40 to a fixed bed plate 41, secured by cap screws 42 to the top wall of member 15.

Figure 8:
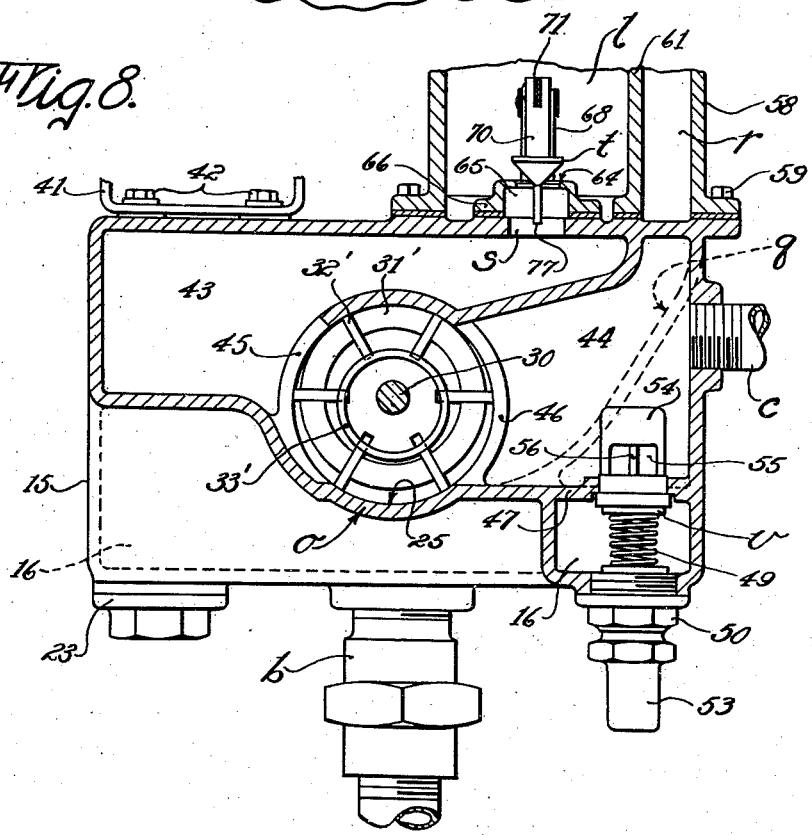
Fig. 8 is a sectional elevational view taken on the line 8—8 of Fig. 4 and showing the second stage pump.

The member 15 is also cored out to provide an inlet chamber 43 (Fig. 8) which lies directly in back of chamber 17 (Fig. 4) and is substantially of the same size and shape (Fig. 8). There is also an outlet chamber 44 which lies directly in back of chamber q. The pump o has ports 45 and 46, respectively communicating with these chambers 43 and 44. The delivery conduit c is connected to the outlet chamber 44. The inlet chamber is supplied with liquid from the separator chamber l through the overlying passage s under the control of valve t in a manner to be later described in detail.

The outlet chamber 44 of the second stage pump o overlies one end of the suction chamber 16 of the first stage pump n and an opening through the partition 47 between these chambers affords a by-pass from the pressure side of the second stage pump back to the suction side of the first stage pump. The valve v controls this by-pass. A spring 49 holds this valve closed against any pressure existing in the outlet chamber 44 during dispensing operations but opens when the pressure reaches a higher figure, say 18 pounds per square inch, as when the valve of nozzle f is closed. The detail of the by-pass valve is shown in Fig. 5. The tension of spring 49 is adjustable by a screw 50, threaded into a plug 51, which in turn is fixed in the base of chamber 16. A lock nut 52 holds screw 50 in its various positions of adjustment. The head of screw 50 is preferably concealed by the hollow cap nut 53. The seat for valve v is formed in one end of a cylindrical cage 54, fixed at its lower end in partition 47. The upper end of this cage is closed but below the closed end are side openings 55 in constant communication with the outlet chamber 44. Fixed to the top of valve v are radial webs 56 (see also Fig. 6) which engage the inner peripheral wall of cage 54 and guide the valve. These webs at their upper ends connect with a piston 57. This piston, working in the cylinder formed by the closed upper end of the cage 54, gives a dashpot action for the purpose of retarding the closure of valve v and avoiding a noisy seating of the same. There is enough clearance between the piston and cylinder to allow fluids to pass slowly from above to below the piston and vice versa.

The separator chamber l and its inlet passage r for the fluid mixture to be separated, are formed in a box-like member 58 (Fig. 7) which is suitably fixed as by cap screws 59 (Fig. 3) to the top wall of member 15. Such wall closes the otherwise open lower end of chamber l. The open lower end of inlet passage r communicates with the discharge passage q of pump n. From Fig. 7 it will be seen that passage r is much wider than passage q and therefore of much greater cross sectional area. Thus there will be a substantial decrease in velocity of the liquid as it leaves passage q and enters passage r. The liquid, rising slowly in passage r, flows over the top 60 (Figs. 3 and 4) of the dam-like partition 61 which separates the passage r from chamber l. The top of this partition lies below the cover plate 62 which is suitably secured to member 58 as by cap screws 63, and which closes the upper end of such member. The vent pipe m is connected to the cover 62. It will be noted that the separator chamber l has but one inlet for the mixture to be separated and that liquid in this chamber cannot flow back into this inlet because, as will later appear, the level of liquid in chamber l is automatically maintained below the top 60 of the dam-like partition 61. There is also a single outlet only for such air or gases as are separated from the liquid in chamber l. Furthermore, there is only one outlet from chamber l for air-free liquid—being the passage s, hereinbefore referred to, which consists of a hole through the top wall of member 15,—such hole connecting the lower part of chamber l to an underlying portion of the inlet chamber 43 of the second stage pump o as shown in Figs. 4 and 8.

The outlet s for air-free liquid is controlled by the described valve t, operated by the float u in chamber l, whereby the valve opens and closes in response to the rise and fall of liquid in this chamber. When float u is in the position shown by dotted lines in Fig. 4, the valve t is closed. When the float rises above such position, the valve t opens and to an increasing degree as it rises to its uppermost limit—being the position shown by full lines. The valve t cooperates with a seat 64 formed at the upper end of a vertical passage 65, formed in a bracket 66, which is fixed as by screws 67 (Fig. 7) to the top wall of member 15 with the passage 65 registering with hole s. This bracket has two arms 68 and 69 which pivotally support the levers for actuating valve t. Thus, the valve t has a stem 70, the upper end of which is slotted to straddle the intermediate portion of a lever 71 and is pivotally connected thereto by a pin 71'. One end of lever 71 fits in the fork-like upper end of arm 68 and is pivotally connected thereto by a pin 72. The other end of lever 71 is forked (see Fig. 7) and the two arms of this forked end engage one with each of two parallel arms 73 and are held against lateral displacement by and between such arms. The arms 73 are pivotally supported at one end by a pin 74 from the arm 69. At the other end these arms 73 are joined and connected, as shown, to float u. The arms 73 form the primary lever of a compound leverage arrangement for opening valve t against the powerful suction of the second-stage pump. Each lever arm 73 (Fig. 4) has a slot 75 therein and a pin 76, fixed to the secondary lever 71, has its ends riding one in each of said slots. The engagement of pin 76 in the left hand end of these slots 75, as shown in Fig. 4, limits the rising movement of float u. The valve t has a long cylindrical pin 77 extending downwardly from its lower end into the passage 65. This pin prevents the valve, which is free to swing to the right or left as viewed in Fig. 4 when raised from its seat, from being displaced so far, while thus raised, that it will not properly engage its seat 64 when float u again descends.

The construction described provides the separator as a separate and removable part of the unit disclosed. This is of advantage in that it enables separators of various sizes to be used with the same pumping unit. For example, in the case of heavy fuel oils such as those used for Diesel engines for example, separation of the air and gases is more difficult and a separator of larger volume or larger cross sectional area may be needed than is the case with lighter and more volatile fuels. In any case, with the one pumping assembly, various separators each proportioned to perform a particular kind of work in the best manner, may be used as is necessary or desired.

The two pumps are of substantially the same size. However, here again, it is easily possible to change the sizes of the pumps, the one relatively to the other, as desired. The partition 26 is slidable in the cylindrical chamber 25 and can shift axially to enable rotor 31' and its blades 32 to be of greater length than the other rotor 31' and its blades 32'.

The apparatus is self-priming. In initially starting up the apparatus the valve of hose nozzle $f$ will be held open until all air has been driven out of the system. With this valve open and the pumps $n$ and $o$ operating, the pump $n$ evacuates all air from the suction pipe $b$ and forces it upwardly through passages $q$ and $r$ into the separator chamber $l$. The only outlet then available for air to leave the separator is the vent pipe $m$—the outlet $s$ being then closed by valve $t$ because there is no liquid in the chamber $l$ to raise float $u$. Thus the air forced up by pump $n$ passes off to the atmosphere by way of vent $m$. Eventually liquid enters and fills the passage $q$ and then the passage $r$ and finally flows over the weir or dam 60, falling into the separator chamber $l$. When liquid accumulates in this chamber to an extent sufficient to raise float $u$, the outlet valve $t$ opens allowing liquid to flow into the inlet of pump $o$. This pump, if of the positively-acting displacement type as shown, will suck out all air from its inlet chamber and force it into the delivery conduit $c$. The pump $o$ will eventually begin to pump liquid and the latter being forced into the delivery conduit will drive out the air ahead of it. In a short time, liquid only will be discharged from the hose nozzle and then the valve of the nozzle is closed. The apparatus is now ready for normal use in dispensing liquids.

In normal operation the suction pipe $b$, the pump chambers and all the other chambers in member 15, the passage $r$ and delivery conduit $c$ are filled with liquid and the separator chamber $l$ contains liquid at least up to the minimum level indicated in Fig. 4 by the lower dot-dash line 80 and the dotted line position of float $u$. If the foot valve $j$ should leak, one or more of these elements,—namely the passages $r$ and $q$, the chamber of the first stage pump, the chambers 17 and 16 and suction pipe $b$, may become partially or wholly drained. This condition, however, is quickly remedied as soon as the pumps are started because pump $n$ will soon drive the air out of all the aforesaid elements, as above described, and fill them with liquid. It is usual practice to start up the pump motor $p$ before the valve of nozzle $f$ is opened. If such practice is followed, the pump $o$, in the initial stage of its operation, cannot force any liquid out of the delivery conduit $c$. Thus the by-pass valve $v$ will open and allow liquid to flow back from the discharge side of pump $o$ to the suction side of the pump $n$. This will tend to accelerate the priming of the first-stage pump and all the passages and chambers associated therewith. The priming will usually be completed in the short time usually elapsing between the closing of motor switch $y$ and the opening of the valve of hose nozzle $f$.

Whether such priming is completed or not, and in any event, the separator chamber $l$ will not be drained of liquid because the valve $t$ will automatically close before complete drainage of the chamber can occur. A tight closure of this valve is insured because the valve is free to find its own seat and, furthermore, the valve is held to its seat by considerable pressure, due to the suction created by the second-stage pump $o$. Leakage of liquid past valve $t$, when closed, is unlikely. The closed valve $t$ has the important function of preventing any air from passing into the second-stage pump $o$ or any of its associated chambers or into the delivery conduit $c$ and particularly into the meter $d$. The advantage of this arrangement will be appreciated when it is realized that it is possible under some circumstances for the first-stage pump $n$ to be pumping air only, in which event the second-stage pump would soon exhaust the available supply of liquid from chamber $l$ unless some means, such as those illustrated,—the valve $t$,— are provided to prevent such action. One common cause of the condition just alluded to, is the depletion of the supply tank $a$. When the level of gasoline drops below the intake end of suction pipe $b$, the first-stage pump $n$ begins pumping air. Another condition, likely to cause a similar difficulty is that of a bad leak in the suction line $b$. In such an event the rate of flow of liquid into separator chamber $l$ would be substantially reduced, while the rate of flow of liquid out of chamber $l$ would not be lessened but for the valve $t$ which closes, whenever necessary, to prevent depletion of chamber $l$. Even though pump $o$ continues to operate and pumps nothing but solid liquid, the rate of delivery of liquid from pump $o$ will automatically be reduced to substantially that of the liquid supply because of the intermittent closing of valve $t$, whenever the liquid in chamber $l$ reaches a dangerously low level.

The apparatus accomplishes the work of separating air from the gasoline more effectively than in any prior apparatus of which I am aware, except that of the related DeLancey application above referred to. All the work of separation is accomplished in the chamber $l$ under atmospheric pressure. The fluids to be separated are delivered into this chamber by the first stage pump $n$ under substantially no pressure and at very low velocity. The decrease in velocity is effected by increasing the cross sectional area of the inlet passage to separator $l$. This will be clear from Fig. 7, in which the passage $r$ is shown as having a cross sectional area at least four times that of the upper end of passage $q$. The velocity of the entering liquid will thus be greatly reduced and it will enter the separator quietly and smoothly. The object is to avoid eddies or any disturbance of any kind in the separator chamber $l$. Not only does the liquid enter the separator slowly but it is evenly distributed along one entire side of the chamber and this is also the longest side. As against delivering the liquid up through a single vertical pipe into the separator in the usual manner, wherein the entry of the liquid is localized, the liquid here is spread out into a very wide and very shallow stream which rolls smoothly over the dam 60 into the chamber $l$. The spreading out of the liquid in this way gives a much better opportunity for air to separate from the liquid and escape through the open vent $m$ into the atmosphere than would otherwise be possible. The separator has a large surface area to secure good air separation.

Separation is effected under the action of differences in densities under conditions which are exceptionally favorable—that is, low velocity of the entering liquid; large surface area of the separating chamber; calm and quiescent condition of the liquid in the separator, and under atmospheric pressure. All the air leaves through vent $m$ and no liquid leaves by this outlet. The liquid from which air has been separated gravitates to the bottom of the separator chamber, where it leaves by the only outlet available and passes into pump $o$ and the delivery line $c$. There is no other way for liquid to leave the separator. No liquid can flow back into the inlet passage $r$ under ordinary circumstances. Thus, none of the pumped liquid can be diverted and all of it follows in the one path to and through the delivery conduit $c$.

What has been said about the separation of air from the liquid applies equally well to any non-condensable gas. Such gas will be separated out in the same manner as above described. However, gases such as gasoline vapor and the like, while susceptible to separation in the same way, are generally condensed or absorbed back into liquid form before reaching the container $l$. The vapor drawn into the displacement pump $n$ is compressed to some extent by this pump and taken back into liquid form, especially when all the liquid being moved for dispensing passes through the pressure condition of the displacement pump. By thus converting the fuel vapor back into the liquid phase, the loss of some fuel, which would otherwise be separated in container $l$ and escape through vent pipe $m$ to the atmosphere, is avoided.

The invention thus affords a liquid dispensing apparatus, wherein a much better separation of air and gases from the liquid is effected before passing the liquid to the meter and wherein all of the liquid pumped up to the separator passes out through the outlets thereof, without the diversion of any part of the pumped liquid as occurs according to the prior practice hereinbefore described.

What I claim is:

1. An air separating apparatus for gasoline dispensing systems, comprising, casing means affording an air separating chamber and immediately below it a pair of pump chambers, two positive displacement pumps mounted one in each of the pump chambers, a common power shaft for driving both pumps; the separating chamber having an inlet port from one of said pumps, an outlet port to the other of said pumps, a dam-like partition between said ports extending from side to side of the separating chamber and rising from the bottom of the separating chamber toward but stopping short of the top thereof to permit gasoline to flow from the inlet to the outlet port over the top edge of said partition, and a vent near the top thereof sufficient to maintain the separator casing at substantially atmospheric pressure; the separator casing having a width in a direction along the dam-like partition greater than its length in a direction at right angles to said partition to insure a slow and quiet flow of gasoline over the top edge of said partition, the area represented by the product of said length and width being sufficiently large to insure a large reduction in the velocity of the gasoline flowing from said inlet to said outlet, one of said pumps arranged for lifting gasoline from a storage tank to and delivering it into said separating casing at substantially atmospheric pressure, the other pump connected to the outlet of said separating chamber for receiving gasoline by gravity flow therefrom and for moving such gasoline to a desired point of discharge, and valve means responsive to the level of gasoline in the separating chamber to control said valve means and operable to close said valve means whenever the first pump fails to deliver gasoline at a rate sufficient to keep the second pump fully primed.

2. An air separating apparatus for gasoline dispensing systems, comprising, a first casing, two positive displacement pumps mounted in said casing, a common power shaft for said pumps mounted in said casing, an air separator casing mounted on the top of said pump casing; the separator casing having an inlet port from one of said pumps, an outlet port to the other of said pumps and a partition wall between said inlet and outlet ports; said partition wall being stopped short of the top of the separator casing to permit gasoline to flow between the ports, the separator casing having a sufficient air vent near the top thereof to maintain atmospheric pressure therein, the separator casing having a sufficiently large cross sectional area to insure a very slow flow of gasoline between said ports relatively to the flow from said displacement pumps, one of said pumps being arranged for moving gasoline from a storage tank to the separator casing, the other pump being arranged for moving the gasoline from the separator casing to a desired point of dispensing, valve means to stop the flow of liquid from the separator casing to the last-named pump, and a float in the separator casing for opening and closing said valve means by the rise and fall of liquid in the separator casing, said float dropping to close said valve means whenever the first pump fails to deliver at a rate to keep the second pump fully primed, and said valve means when closed being held closed by the suction pull of the second pump.

3. An air separating apparatus for gasoline dispensing systems, comprising in combination, a first casing two positive displacement pumps mounted in said casing, a common power shaft for said pumps, a second casing forming an air separator casing removably mounted on the top of said pump casing, said casings having registering openings by which the discharge port of one pump is connected with the inlet port of the other pump through the air separator casing, the separator casing being supplied with a free vent at the top to maintain atmospheric pressure therein and a high partition wall stopping short of the top wall and located between the registering openings, one pump having a suction pipe to connect with a gasoline supply reservoir, the other pump having a discharge passage for connection with a dispensing line and also having a normally closed return branch line to said suction pipe of the other pump, a spring-loaded valve in said line operable to open it under a predetermined fluid pressure, and mechanism in said separator casing operable to close the liquid discharge opening therefrom when the rate of flow through the discharge opening tends to exceed the rate of flow through the inlet port as said two pumps are operated by their common power shaft.

ALFRED L. GRISÉ.